United States Patent
Sasamoto et al.

(10) Patent No.: US 11,886,169 B2
(45) Date of Patent: Jan. 30, 2024

(54) CONTROL APPARATUS

(71) Applicant: Hitachi, Ltd., Tokyo (JP)

(72) Inventors: Manabu Sasamoto, Tokyo (JP); Hidenori Omiya, Tokyo (JP); Yusaku Otsuka, Tokyo (JP); Teruaki Sakata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 70 days.

(21) Appl. No.: 17/547,392

(22) Filed: Dec. 10, 2021

(65) Prior Publication Data

US 2022/0206475 A1 Jun. 30, 2022

(30) Foreign Application Priority Data

Dec. 25, 2020 (JP) ................. 2020-216130

(51) Int. Cl.
*G05B 19/418* (2006.01)

(52) U.S. Cl.
CPC ... *G05B 19/41815* (2013.01); *G05B 19/4183* (2013.01); *G05B 19/41855* (2013.01)

(58) Field of Classification Search
USPC .......................................................... 700/19
See application file for complete search history.

(56) References Cited

U.S. PATENT DOCUMENTS

| 11,228,499 | B1* | 1/2022 | Maruyama | H04L 41/0823 |
| 2012/0057479 | A1* | 3/2012 | Maruyama | H04J 3/0667 370/252 |
| 2016/0001983 | A1* | 1/2016 | Ooba | G05B 19/4182 414/787 |
| 2020/0267094 | A1* | 8/2020 | Maruyama | H04L 67/563 |

FOREIGN PATENT DOCUMENTS

| JP | 2009260785 | A | * | 11/2009 |
| JP | 2014127887 | A | * | 7/2014 |
| JP | 2019046296 | A | * | 3/2019 |
| JP | 2020-101995 | A | | 7/2020 |

\* cited by examiner

*Primary Examiner* — Hien D Khuu
(74) *Attorney, Agent, or Firm* — Mattingly & Malur, PC (57) ABSTRACT

A control apparatus of the present invention is a control apparatus included in a distributed control system. The control apparatus includes a time synchronization unit configured to synchronize the control apparatus with another control apparatus included in the distributed control system in terms of time, a communication unit configured to receive information from the other control apparatus, an information holding unit configured to add synchronization time information to the information and hold the resulting information, an area setting unit configured to set an area of the information holding unit according to a time difference of the information, an information selection unit configured to select shared data from the information stored in the information holding unit, and a shared data storage unit configured to store the shared data selected by the information selection unit.

5 Claims, 10 Drawing Sheets

| ACQUISITION TIME | SENSOR INFORMATION FROM SENSOR 7 |
|---|---|
| t3 | a-3 |
| t4 | a-4 |
| t5 | a-5 |
| t6 | a-6 |
| t7 | a-7 |

FIG.6B

| ACQUISITION TIME | SENSOR INFORMATION FROM SENSOR 10 |
|---|---|
| t5 | b-5 |
| t6 | b-6 |
| t7 | b-7 |

FIG.6C

| ACQUISITION TIME | SENSOR INFORMATION FROM SENSOR 12 | SENSOR INFORMATION FROM SENSOR 13 |
|---|---|---|
| t7 | c1-7 | c2-7 |

CONTROL APPARATUS

CLAIM OF PRIORITY

The present application claims priority from Japanese Patent application serial no. 2020-216130, filed on Dec. 25, 2020, the content of which is hereby incorporated by reference into this application.

BACKGROUND OF THE INVENTION

1. Field of the Invention

The present invention relates to a control apparatus included in a control system.

2. Description of the Related Art

Control systems are installed in various social infrastructure systems, and the control systems are automated and streamlined to automate and streamline the social infrastructure systems. In the control system, a plurality of control apparatuses configured to execute calculation processing are installed to automate and streamline the control system.

Such a control apparatus included in the control system acquires, from a detector such as a sensor installed in the field, acquisition information such as various state quantities and executes calculation processing by a central processing unit of the control apparatus. Then, the control apparatus outputs a control command (control data (control signal)) to operation equipment (control target) such as a motor or an actuator installed in the field, to thereby control the control target in real time.

Further, a control system in a large-scale social infrastructure system includes a plurality of control apparatuses connected to each other via a common network and forms a distributed control system. The distributed control system aggregates acquisition information acquired by a plurality of detectors installed in the vast field to a single control apparatus, and executes calculation processing. Such a distributed control system uses the control apparatus for calculation processing and the control apparatus for control command output in a role sharing manner, to thereby execute efficient control.

As a communication method for control apparatuses in a distributed control system, the shared memory scheme is given. In the shared memory scheme, the control apparatuses of the distributed control system each include a shared memory that is a collection of memories assigned to the respective control apparatuses, and one control apparatus periodically broadcasts data assigned thereto to the other control apparatuses. With this, data is shared between the control apparatuses, so that the load of communication between the control apparatuses is reduced.

As a background art in such a technical field, JP-2020-101995-A is given.

In JP-2020-101995-A, there is described a control system including a plurality of control apparatuses, the control apparatuses each including a control unit configured to control a control target, a memory unit configured to store modes of a plurality of the control units, and a network communication unit configured to establish communication between the plurality of control units via a network, in which one control unit receives the mode of another control unit by cyclic transmission via the network communication unit, transmits, by cyclic transmission via the network communication unit, the mode of the control unit itself and the received mode of the other control unit, and updates, based on the mode of the control unit itself and the received mode of the other control unit, the modes of the control units stored in the memory unit (see the abstract of JP-2020-101995-A).

SUMMARY OF THE INVENTION

In JP-2020-101995-A, there is described the control system in which the control unit of one control apparatus receives the mode of another control unit, transmits the mode of the control unit itself and the received mode of the other control unit, and updates, based on the mode of the control unit itself and the received mode of the other control unit, the modes of the control units stored in the memory unit. Further, in JP-2020-101995-A, there is described the control system configured to add timestamps to the respective modes of the plurality of control units and calculate a delay time to the transmission of the mode of the subsequent control unit by the control unit, to thereby cause the control units to control the control target at the same timing.

However, in JP-2020-101995-A, there is described no control apparatus configured to calculate a control command for a control target from acquisition information acquired from detectors at different times.

Thus, the present invention provides a control apparatus configured to calculate a control command for a control target from acquisition information acquired from detectors at different times, to thereby enhance the quality of a product and achieve highly accurate control.

In order to solve the above-mentioned problem, according to the present invention, there is provided a control apparatus included in a distributed control system. The control apparatus includes a time synchronization unit configured to synchronize the control apparatus with another control apparatus included in the distributed control system in terms of time, a communication unit configured to receive information from the other control apparatus, an information holding unit configured to add synchronization time information to the information and hold the resulting information, an area setting unit configured to set an area of the information holding unit according to a time difference of the information, an information selection unit configured to select shared data from the information stored in the information holding unit, and a shared data storage unit configured to store the shared data selected by the information selection unit.

According to the present invention, it is possible to provide a control apparatus configured to calculate a control command for a control target from acquisition information acquired from detectors at different times, to thereby enhance the quality of a product and achieve highly accurate control.

Note that objects, configurations, and effects other than those described above are revealed in the following description of embodiments.

DESCRIPTION OF THE PREFERRED EMBODIMENTS

Now, embodiments of the present invention are described with reference to the drawings. Note that components substantially identical or similar to each other are denoted by the identical reference symbols, and overlapping description is omitted in some cases, if any.

Embodiment 1

First, a configuration of a control system according to Embodiment 1 is described.

Figure 1:
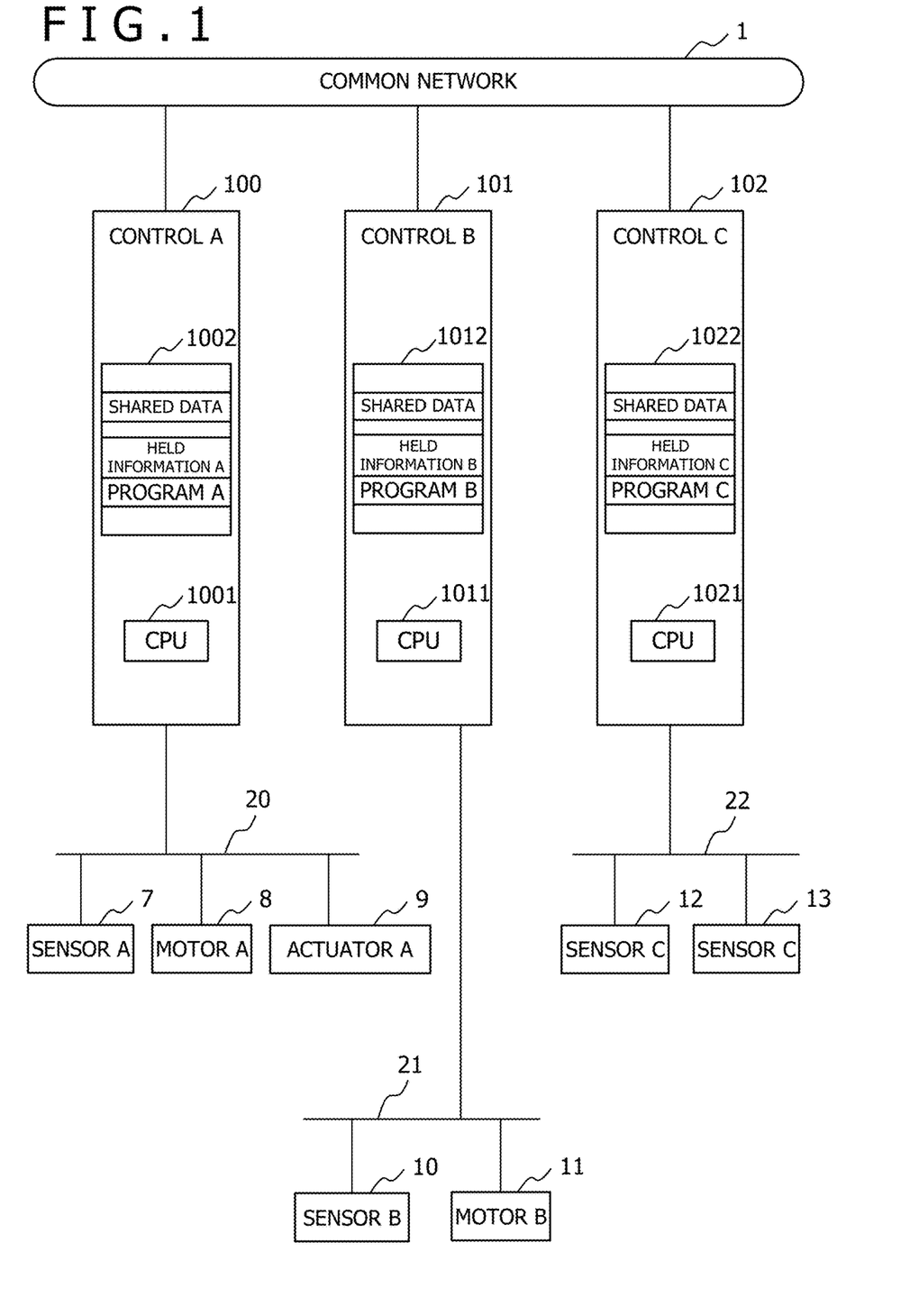
FIG. 1 is an explanatory diagram illustrating a configuration of a control system according to Embodiment 1.

FIG. 1 is an explanatory diagram illustrating the configuration of the control system according to Embodiment 1.

This control system includes a control apparatus (control A) 100, a control apparatus (control B) 101, and a control apparatus (control C) 102 that are connected to each other via a common network 1, and forms a distributed control system.

The control apparatuses each output a control command (control data (control signal or command value)) to operation equipment (control target or to-be-controlled apparatus) such as a motor or an actuator installed in the field, to thereby control the control target in real time. That is, the distributed control system includes the control apparatuses configured to control the operation equipment.

The common network 1 is a network for increasing time certainty of a communication delay between the control apparatuses, by using time slot communication based on time-sharing control, for example, a network for executing data communication by a communication method including the series of IEEE standards, which is called time sensitive network (TSN), or an industrial network standardized by IEC 61784.

The control apparatus 100 incorporates a central processing unit (CPU) 1001 and a memory 1002. In a similar manner, the control apparatus 101 incorporates a CPU 1011 and a memory 1012, and the control apparatus 102 incorporates a CPU 1021 and a memory 1022.

The memory 1002 has an area for holding a program A that operates on the control apparatus and held information A acquired by the control apparatus, and an area for holding shared data (acquisition information selected by the control A or a control command) that is shared between the control apparatuses via the common network 1 (shared data area). In a similar manner, the memory 1012 has an area for holding a program B and held information B and an area for holding shared data (acquisition information selected by the control B or a control command). The memory 1022 has an area for holding a program C and held information C and an area for holding shared data (acquisition information selected by the control C or a control command).

Further, a sensor A 7, a motor A 8, and an actuator A 9 are connected to the control apparatus 100 via a field network 20. In a similar manner, a sensor B 10 and a motor B 11 are connected to the control apparatus 101 via a field network 21. A sensor C 12 and a sensor C 13 are connected to the control apparatus 102 via a field network 22.

Note that, as the field network 20, the field network 21, and the field network 22, for example, a network defined by IEC 61158 may be used. Further, a detector or a control target may be connected to a control apparatus directly or with input/output of digital signals or analog signals. In this case, the detector or the control target are connected to the control apparatus by a plurality of input/output signal lines.

The control apparatus 100 receives an input from the sensor 7 and shares shared data with the control apparatus 101 and the control apparatus 102 via the common network 1. In a similar manner, the control apparatus 101 receives an input from the sensor 10 and shares shared data with the control apparatus 100 and the control apparatus 102 via the common network 1. The control apparatus 102 receives inputs from the sensor 12 and the sensor 13 and shares shared data with the control apparatus 100 and the control apparatus 101 via the common network 1.

Further, in particular, the control apparatus 102 calculates, from the shared input data, for example, control commands (command values) for the motor 8, the actuator 9, and the motor 11 and shares the control commands with the control apparatus 100 and the control apparatus 101. Meanwhile, the control apparatus 100 controls the motor 8 and the actuator 9 according to the shared control commands, and in a similar manner, the control apparatus 101 controls the motor 11 according to the shared control command.

Note that the sensor 7, the sensor 10, the sensor 12, and the sensor 13 installed in the field are detectors and acquire (detect), as acquisition information, various state quantities such as a flow rate, a temperature, a pressure, a tension, and a rotation speed.

Next, a configuration of the control apparatus 100 according to Embodiment 1 is described.

Figure 2:
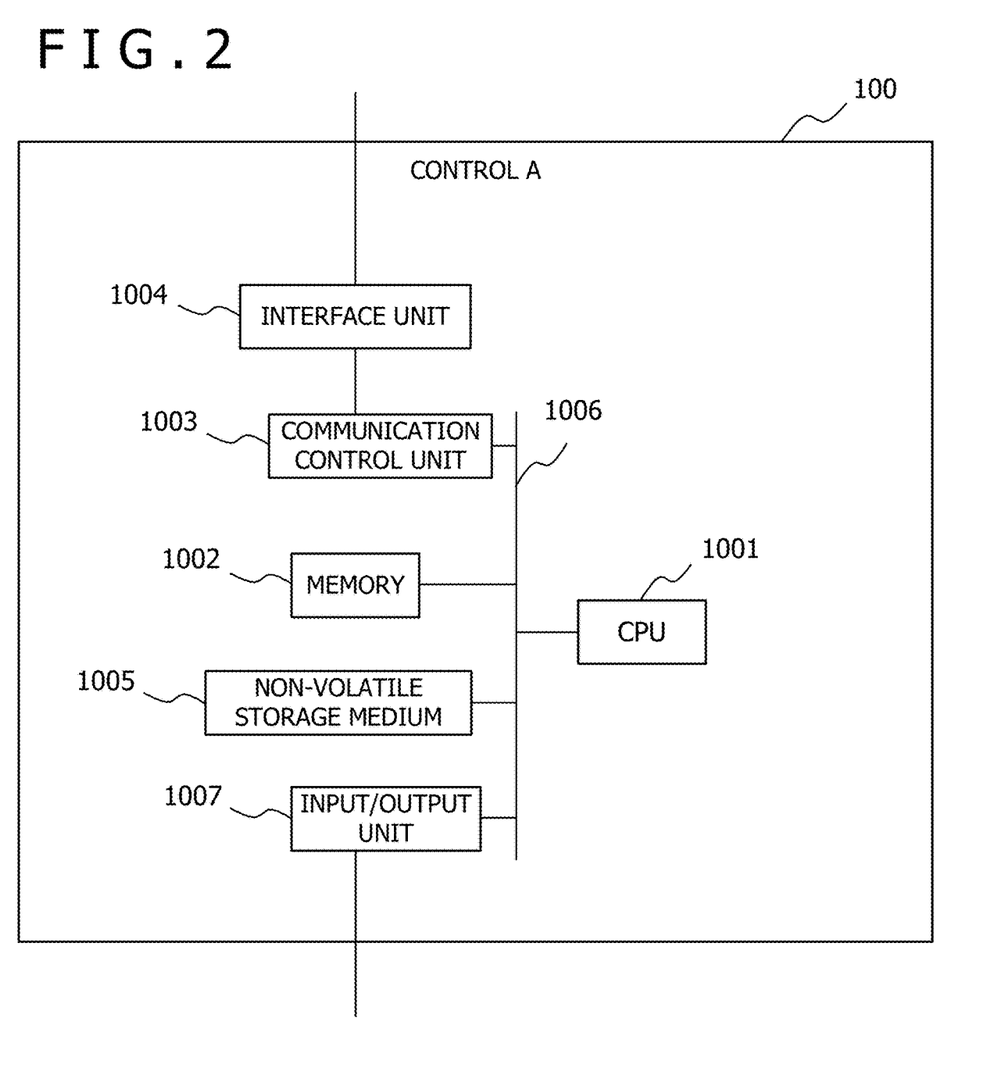
FIG. 2 is an explanatory diagram illustrating a configuration of a control apparatus according to Embodiment 1.

FIG. 2 is an explanatory diagram illustrating the configuration of the control apparatus 100 according to Embodiment 1.

The control apparatus 100 includes the CPU 1001, the memory 1002, a communication control unit 1003, an interface unit 1004, a non-volatile storage medium 1005, a bus 1006, and an input/output unit 1007.

Note that, here, the control apparatus 100 is described, but the basic configurations of the control apparatus 101 and the control apparatus 102 are similar to that of the control apparatus 100.

The CPU 1001 is a central processing unit configured to control operation of each component of the control apparatus 100.

The memory 1002 is a temporal storage area that is used by the CPU 1001 to operate, and stores an operating system (hereinafter referred to as an "OS"), application programs, and the like transferred from the non-volatile storage medium 1005.

Further, the memory 1002 has the area for holding the program A that operates on the control apparatus and the held information A acquired by the control apparatus (information acquired by the control apparatus from the detector or the control target), and the area for holding shared data (acquisition information selected by the control A or a control command) that is shared between the control apparatuses via the common network 1.

The communication control unit 1003 executes data communication with the control apparatus 101 and the control apparatus 102 via the common network 1. As the data communication method, for example, a media access control (MAC) layer function complying with the IEEE 802.3 standard is implemented.

Note that the communication control unit 1003 is implemented as, for example, an integrated circuit (IC), a field programmable gate array (FPGA), or a gate array. Further, the communication control unit 1003 may be integrated with the CPU 1001.

In addition, the communication control unit 1003 has a function of executing a time synchronization protocol using a network. That is, the communication control unit 1003 has a timekeeping function for transmission/reception of a time synchronization packet and a function of setting or adding a correction value to a time synchronization packet, for example. As such a time synchronization protocol, IEEE 1588, IEEE 802.1AS, network time protocol (NTP), or simple network time protocol (SNTP) is used.

Further, the communication control unit 1003 has, as a synchronization time-based time management function, a function of synchronization time information communication with the control apparatus 101 and the control apparatus 102.

Further, FIG. 2 illustrates the case where the single communication control unit 1003 is provided, but a plurality of communication control units 1003 may be provided, as with the interface units 1004 described below.

The interface unit 1004 transmits/receives data to/from the common network 1. The interface unit 1004 implements, for example, the IEEE 802.3 physical layer function. Note that the interface unit 1004 may be included in the communication control unit 1003.

Further, FIG. 2 illustrates the case where the single interface unit 1004 is provided, but a plurality of interface units 1004 may be provided, as with the communication control units 1003 described above.

The non-volatile storage medium 1005 is an information storage medium and is used for storing, for example, the OS, applications, a device driver, programs for operating the CPU 1001, and program execution results.

The non-volatile storage medium 1005 includes, for example, a hard disk drive, a solid-state drive, or a flash memory. Further, the non-volatile storage medium 1005 may include a universal serial bus (USB) memory, which is an easily removable external storage medium, a solid-state drive, or the like.

The input/output unit 1007 is an input/output interface configured to acquire acquisition information from, for example, the sensor 7 connected to the control apparatus 100 and control the motor 8 and the actuator 9. The input/output unit 1007 implements, for example, the various functions of the field network 20 described above and a digital input/output function or an analog input/output function. Note that FIG. 2 illustrates the case where the single signal line is extended from the input/output unit 1007, but a plurality of signal lines may be provided.

The bus 1006 connects the CPU 1001, the memory 1002, the communication control unit 1003, the non-volatile storage medium 1005, and the input/output unit 1007 to each other.

Next, a functional configuration of the control apparatus according to Embodiment 1 is described.

Figure 3:
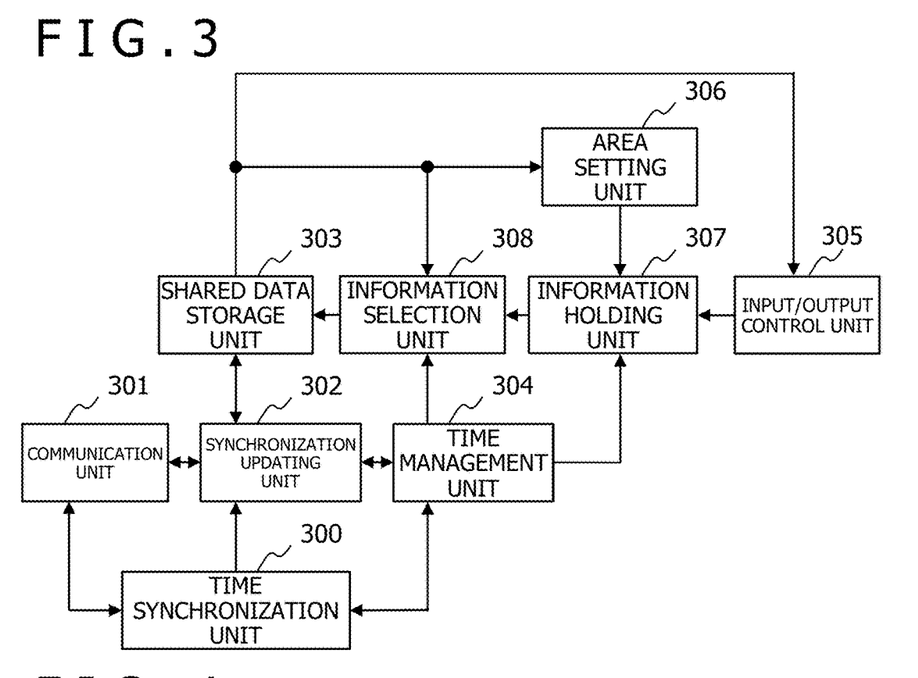
FIG. 3 is an explanatory diagram illustrating a functional configuration of the control apparatus according to Embodiment 1.

FIG. 3 is an explanatory diagram illustrating the functional configuration of the control apparatus according to Embodiment 1.

The control apparatus includes a time synchronization unit 300, a communication unit 301, a synchronization updating unit 302, a shared data storage unit 303, a time management unit 304, an input/output control unit 305, an area setting unit 306, an information holding unit 307, and an information selection unit 308. That is, the control apparatus 100, the control apparatus 101, and the control apparatus 102 each preferably include these functional units. In particular, the control apparatus 100 and the control apparatus 101 include these functional units.

The time synchronization unit 300 is a functional unit configured to execute a time synchronization procedure. As the time synchronization protocol to be executed, IEEE 1588, IEEE 802.1AS, NTP, or SNTP described above is used. Note that the time synchronization unit 300 synchronizes the control apparatus with the control apparatus 101 and the control apparatus 102 in terms of time by using, for example, a time measured when a time synchronization packet is transmitted or received by the communication unit 301, which is described later. That is, the time synchronization unit 300 synchronizes the control apparatus with the other control apparatuses included in the distributed control system in terms of time.

Note that the time synchronization unit 300 may be achieved by an application that operates on the CPU 1001, or may be achieved as a hardware logic in a case where the communication control unit 1003 includes an IC or an FPGA.

Further, the time synchronization unit 300 may include both the software of the CPU 1001 and the hardware of the communication control unit 1003. Note that, in this case, the communication control unit 1003 has a function of measuring the transmission timing and reception timing of a time synchronization packet and a function of generating a time synchronization packet format.

The communication unit 301 is a functional unit connected to the common network 1 and configured to establish communication on the basis of the communication protocol of the common network 1. For example, the communication unit 301 includes software that operates on the CPU 1001, the communication control unit 1003, and the interface unit 1004. That is, via the common network 1, the communication unit 301 transmits information regarding the control apparatus itself to the other control apparatuses and receives information regarding the other control apparatuses from the other control apparatuses. The communication unit 301 transmits information regarding the control apparatus itself (sensor information) acquired by the control apparatus and receives information regarding the other control apparatuses (sensor information) acquired by the other control apparatuses.

The synchronization updating unit 302 is a functional unit configured to hold communication contents received from the communication unit 301. The synchronization updating unit 302 reflects, with synchronization time information notified from the time management unit 304 described later (including time notification, time notification interrupt, or the like), held information in the shared data storage unit 303, which is described later. That is, the synchronization updating unit 302 stores shared data (information) in the shared data storage unit 303 of the control apparatus itself in synchronization with the storage of the shared data (information) in the shared data storage units of the other control apparatuses or in synchronization with the storage of shared data (information) from the shared data storage units of the other control apparatuses.

The shared data storage unit 303 is a functional unit configured to hold (store) shared data (information) that is shared between the control apparatuses. The shared data storage unit 303 has the shared data area of the control apparatus. For example, each control apparatus executes periodic broadcast communication, and the control apparatus that has received shared data identifies the control apparatus that has transmitted the shared data, and updates the corresponding shared data area. That is, the shared data storage unit 303 stores shared data selected by the information selection unit 308, which is described later. Further, the shared data storage unit 303 stores shared data transmitted from the other control apparatuses and a control command for the control target calculated by a calculation unit 401, which is described later.

The time management unit 304 is a functional unit configured to manage, on the basis of a synchronization time, synchronization time information for the information holding unit 307 and the information selection unit 308, which are described later, of the control apparatus.

The input/output control unit 305 is a functional unit configured to acquire acquisition information from, for example, the sensor 7 connected to the control apparatus 100 and control the motor 8 and the actuator 9, thereby executing input and output of information. That is, the input/output control unit 305 acquires acquisition information from the detector and executes input and output of information for controlling the control target.

The area setting unit 306 is a functional unit configured to set a holding area size (area) of the information holding unit 307, which is described later. The holding area size is set from a processing time difference between the control apparatuses (calculated by the time management unit 304), for example, an acquisition time difference of acquisition information (sensor information) acquired by the control apparatuses from the shared data storage units 303 or a time difference calculated from a flux rate of the control system based on control commands for the control targets connected to the respective control apparatuses (acquisition time difference). That is, the area setting unit 306 sets the holding area size of the information holding unit 307 according to the processing time difference between the control apparatuses, that is, the time difference of shared data (sensor information).

The processing time difference between the control apparatuses is a time difference of information, and the time difference of information is a difference between an acquisition time at which the control apparatus itself acquires information (sensor information) and an acquisition time at which another control apparatus acquires information (sensor information) (acquisition time difference).

Note that the holding area size of an upstream control apparatus is larger than that of a downstream control apparatus in the control system. The holding area size decreases in order of the control apparatus 100, the control apparatus 101, and the control apparatus 102. That is, the holding area size is a size of an area for holding shared data selected by each control apparatus.

That is, the area setting unit 306 of the control apparatus located upstream on a manufacturing line, which acquires information earlier, sets a larger information holding area than the area setting unit 306 of the control apparatus located downstream on the manufacturing line, which acquires information later, sets.

The information holding unit 307 is a functional unit configured to hold sensor information input from the input/output control unit 305. The information holding unit 307 is a ring buffer having a holding area size set by the area setting unit 306. The information holding unit 307 holds sensor information and synchronization time information notified from the time management unit 304 (sensor information having added thereto a time at which the sensor information has been acquired), that is, the sensor information and the time at which the sensor information has been acquired. Then, the information holding unit 307 adds the synchronization time information to the information and holds the sensor information.

The information selection unit 308 is a functional unit configured to select information necessary for sharing between the control apparatuses (shared data) from information held (stored) in the information holding unit 307. Then, the information selection unit 308 stores the selected shared data in the shared data storage unit 303. That is, the information selection unit 308 selects shared data from information stored in the information holding unit 307 and stores the selected shared data in the shared data storage unit 303.

Further, the information selection unit 308 selects shared data on the basis of the acquisition time difference of sensor information. Further, the information selection unit 308 calculates the acquisition time difference of sensor information on the basis of times at which the control apparatuses acquire sensor information or control commands for the control targets.

The information is selected on the basis of the synchronization time information added to the information. That is, this information is selected on the basis of, for example, a processing time difference between the control apparatuses, for example, the acquisition time difference of sensor information acquired by the control apparatuses from the shared data storage units 303 or the time difference calculated from the flux rate of the control system based on control commands for the control targets connected to the respective control apparatuses (acquisition time difference).

In this way, the control apparatus according to Embodiment 1 includes the time synchronization unit 300 configured to synchronize the control apparatus with the other control apparatuses included in the distributed control system in terms of time, the communication unit 301 configured to transmit information regarding the control apparatus itself to the other control apparatuses and receive information regarding the other control apparatuses from the other control apparatuses, the information holding unit 307 configured to add synchronization time information to information and hold the information, the area setting unit 306 configured to set the area of the information holding unit 307 according to the time difference of the information, the information selection unit 308 configured to select shared data from the information stored in the information holding unit 307, and the shared data storage unit 303 configured to store the shared data selected by the information selection unit 308.

Note that the communication unit 301 transmits shared data selected by the information selection unit 308.

With this, the control apparatus according to Embodiment 1 can calculate a control command for the control target from acquisition information acquired from the detectors at different times, to thereby enhance the quality of a product and achieve highly accurate control.

Further, since the control apparatus according to Embodiment 1 is not an apparatus configured to estimate a past state from a current state and calculate a control command for a control target on the basis of the estimation result, the control apparatus can suppress errors of a control command for the control target and therefore achieve stable control.

Next, another functional configuration of the control apparatus according to Embodiment 1 is described.

Figure 4:
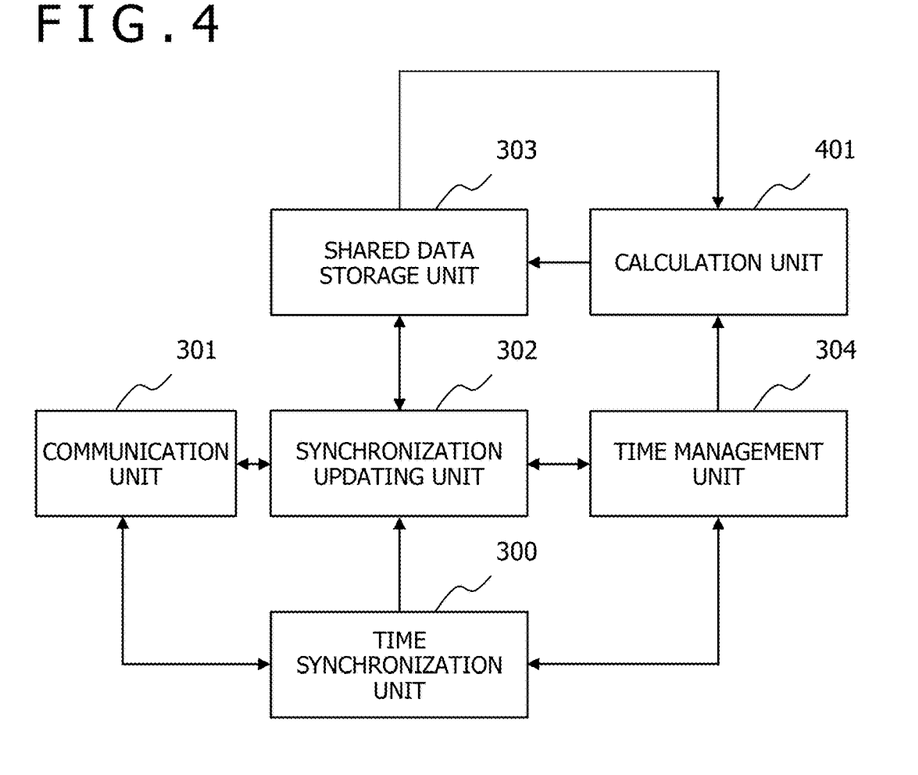
FIG. 4 is an explanatory diagram illustrating another functional configuration of the control apparatus according to Embodiment 1.

FIG. 4 is an explanatory diagram illustrating the other functional configuration of the control apparatus according to Embodiment 1.

This control apparatus includes the time synchronization unit 300, the communication unit 301, the synchronization updating unit 302, the shared data storage unit 303, the time management unit 304, the calculation unit 401, the area setting unit 306 (not illustrated), the information holding unit 307 (not illustrated), and the input/output control unit 305 (not illustrated). Note that the functional units of the time synchronization unit 300, the communication unit 301, the synchronization updating unit 302, the shared data storage unit 303, the time management unit 304, the area setting unit 306, the information holding unit 307, and the input/output control unit 305 basically have functions similar to those of the functional units illustrated in FIG. 3.

This control apparatus particularly includes the calculation unit 401 and corresponds to the control apparatus 102. Note that the control apparatus illustrated in FIG. 3 may include the calculation unit 401. That is, the control apparatus 102 includes the calculation unit 401.

The calculation unit 401 is a functional unit configured to calculate a control command necessary for the control of the motor or actuator connected to the input/output control unit 305. The calculation unit 401 executes calculation processing by using acquisition information (sensor information) acquired by each control apparatus from the shared data storage unit 303. The calculation unit 401 reads acquisition information (sensor information) stored in the shared data storage unit 303 and calculates a control command. The calculated control command is stored in the shared data storage unit 303 to be shared with the other control apparatuses (control apparatus 100 and control apparatus 101). That is, the calculation unit 401 calculates a control command for the control target on the basis of shared data transmitted by the communication unit 301.

A control command to be assigned to the control apparatus itself (control apparatus 100 or control apparatus 101) is read from the shared data storage unit 303 of the control apparatus and output to the motor or actuator connected to the input/output unit 1007 illustrated in FIG. 2 (input/output control unit 305 illustrated in FIG. 3). Note that the calculation unit 401 is achieved by software that operates on the CPU 1001.

Next, operation timings of the control apparatuses according to Embodiment 1 are described.

Figure 5:
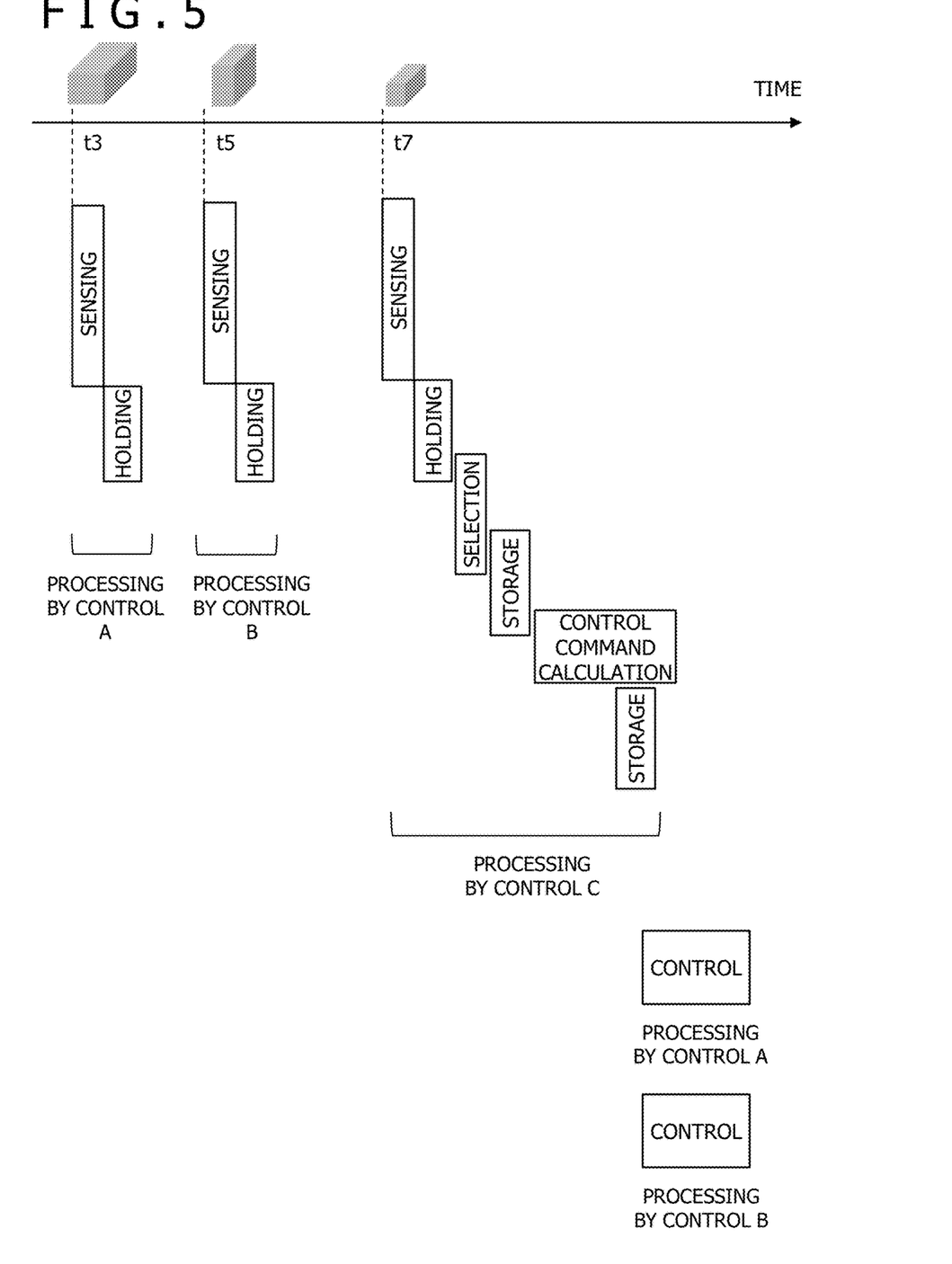
FIG. 5 is an explanatory diagram illustrating operation timings of control apparatuses according to Embodiment 1.

FIG. 5 is an explanatory diagram illustrating the operation timings of the control apparatuses according to Embodiment 1.

FIG. 5 illustrates a case where, for example, the control apparatus 100, the control apparatus 101, and the control apparatus 102 are installed from upstream to downstream on the manufacturing line, and objects to be manufactured are successively conveyed from upstream to downstream.

The area setting unit 306 of each control apparatus sets the holding area size of the information holding unit 307 of the control apparatus on the basis of a processing time difference on the manufacturing line, namely, the acquisition time difference of sensor information here.

A certain object to be manufactured is paid attention to. At a time t3, the control apparatus 100 observes (senses) the processed state of the object by the sensor 7, and at a time t5, the control apparatus 101 observes (senses) the processed state of the object by the sensor 10. At a time t7, the control apparatus 102 observes (senses) the processed state of the object by the sensor 12 and the sensor 13.

Here, with the processing time (time t7) of the control apparatus 102 located downstream being a reference, with respect to the control apparatus 102, the control apparatus 101 secures a holding area size for holding information corresponding to the inter-control apparatus processing time difference of (t7−t5), and the control apparatus 100 secures a holding area size for holding information corresponding to the inter-control apparatus processing time difference of (t7−t3).

At the time t3, the control apparatus 100 acquires information on the shape and position of the object to be manufactured by the sensor 7, and holds the information in the information holding unit 307 of the control apparatus 100 together with the acquisition time. At the time t5, the control apparatus 101 acquires information on the shape and position of the object to be manufactured by the sensor 10, and holds the information in the information holding unit 307 of the control apparatus 101 together with the acquisition time. At the time t7, the control apparatus 102 acquires information on the shape and position of the object to be manufactured by the sensor 12 and the sensor 13, and holds the information in the information holding unit 307 of the control apparatus 102 together with the acquisition time. Note that the control apparatuses perform the processing sequentially over time.

Here, at the time t7, the control apparatus 100 selects, by the information selection unit 308, the sensor information acquired at the time t3 and held in the information holding unit 307 of the control apparatus 100, and stores the sensor information in the shared data storage unit 303. The control apparatus 101 selects, by the information selection unit 308, the sensor information acquired at the time t5 and held in the information holding unit 307 of the control apparatus 101, and stores the sensor information in the shared data storage unit 303. The control apparatus 102 selects, by the information selection unit 308, the sensor information acquired at the time t7 and held in the information holding unit 307 of the control apparatus 102, and stores the sensor information in the shared data storage unit 303.

The sensor information stored in the shared data storage unit 303 of each control apparatus is transmitted to the other control apparatuses to allow each control apparatus to update the shared data storage unit 303 by the synchronization updating unit 302.

In addition, the control apparatus 102 calculates a control command on the basis of the selected sensor information and stores the calculation result (control command) in the shared data storage unit 303. Then, the stored calculation result (control command) is transmitted to the control apparatus 100 and the control apparatus 101, and the control apparatus 100 and the control apparatus 101 each control the corresponding motor or actuator on the basis of the calculation result (control command) stored in the shared data storage unit 303.

In this way, according to Embodiment 1, a control command can be calculated on the basis of sensor information regarding the same object to be manufactured. Thus, errors of a control command for the control target can be suppressed, and stable control can therefore be achieved.

Next, exemplary contents of the information holding units 307 of the control apparatuses according to Embodiment 1 are described.

Figure 6A:
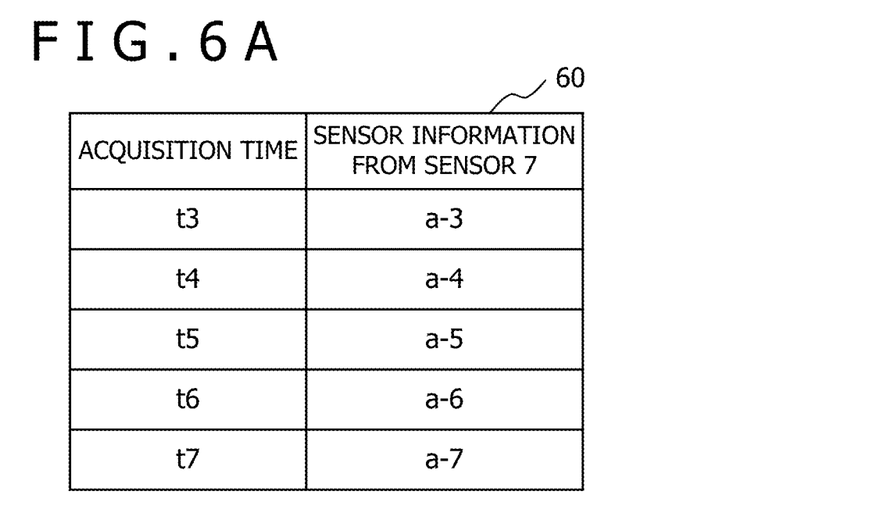
FIGS. 6A to 6C are explanatory diagrams illustrating exemplary contents of information holding units of the control apparatuses according to Embodiment 1.
Figure 6B:
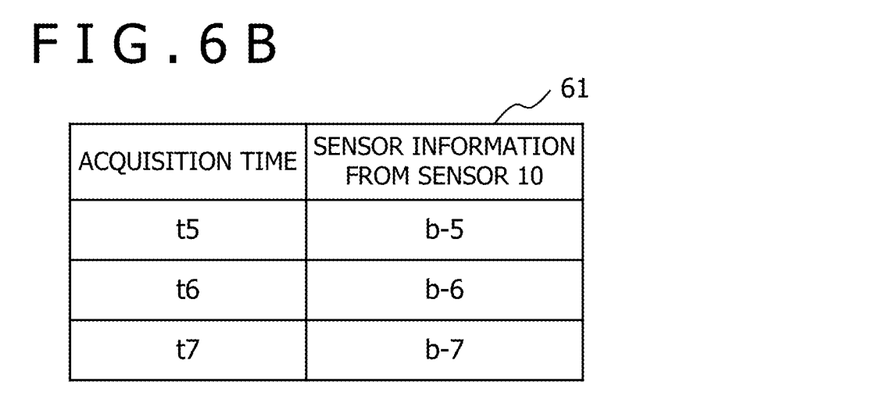
Figure 6C:
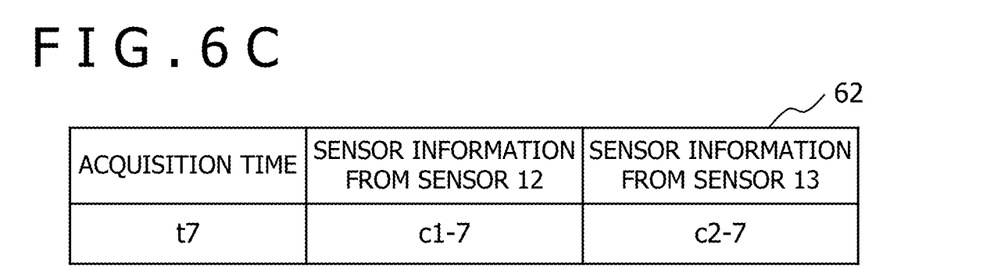

FIGS. 6A to 6C are explanatory diagrams illustrating exemplary contents of the information holding units 307 of the control apparatuses according to Embodiment 1.

FIGS. 6A to 6C illustrate, for example, exemplary holding area contents of the information holding unit 307 of each control apparatus at the time t7. FIG. 6A illustrates a holding area 60 corresponding to exemplary holding area contents of the information holding unit 307 of the control apparatus 100. FIG. 6B illustrates a holding area 61 corresponding to exemplary holding area contents of the information holding unit 307 of the control apparatus 101. FIG. 6C illustrates a holding area 62 corresponding to exemplary holding area contents of the information holding unit 307 of the control apparatus 102.

In the holding area 60, sensor information acquired by the sensor 7 connected to the control apparatus 100 is stored together with the acquisition time from the time t3. In the holding area 61, sensor information acquired by the sensor 10 connected to the control apparatus 101 is stored together with the acquisition time from the time t5. In the holding area 62, sensor information acquired by the sensor 12 and the sensor 13 connected to the control apparatus 102 is stored together with the time t7.

In the holding area 60, the sensor information acquired from the time t3 to the time t7 (data values a-3 to a-7) is held. In the holding area 61, the sensor information acquired from the time t5 to the time t7 (data values b-5 to b-7) is held. In the holding area 62, the sensor information acquired at the time t7 (data values c1-7 and c2-7) is held.

That is, with respect to the control apparatus 102, the control apparatus 101 has the inter-control apparatus processing time difference of (t7−t5), and the control apparatus 100 has the inter-control apparatus processing time difference of (t7−t3). The control apparatus 100 and the control apparatus 101 hold information corresponding to the respective time differences. In this way, the holding area size decreases in order of the control apparatus 100, the control apparatus 101, and the control apparatus 102. With this, the control apparatuses according to Embodiment 1 each do not need to hold the information corresponding to the time difference of (t7−t3), and hold the bare minimum information.

The information selection unit 308 of the control apparatus 100 selects the sensor information acquired by the sensor 7 at the time t3 (data value a-3) and stores the sensor information in the shared data storage unit 303 of the control apparatus 100. The information selection unit 308 of the control apparatus 101 selects the sensor information acquired by the sensor 10 at the time t5 (data value b-5) and stores the sensor information in the shared data storage unit 303 of the control apparatus 101. The information selection unit 308 of the control apparatus 102 selects the sensor information acquired by the sensor 12 at the time t7 (data value c1-7) and the sensor information acquired by the sensor 13 at the time t7 (data value c2-7), and stores the sensor information in the shared data storage unit 303 of the control apparatus 102.

The calculation unit 401 of the control apparatus 102 calculates a control command at the time t7 on the basis of the data information stored in the shared data storage unit 303 of the control apparatus 102 which data information has been acquired from the other control apparatuses and the control apparatus 102. That is, in this calculation, the sensor information acquired by the control apparatus 100 from the sensor 7 at the time t3, the sensor information acquired by the control apparatus 101 from the sensor 10 at the time t5, and the sensor information acquired by the control apparatus 102 from the sensor 12 and the sensor 13 at the time t7 are used.

Next, exemplary contents of the shared data storage unit 303 of the control apparatus according to Embodiment 1 are described.

Figure 7:
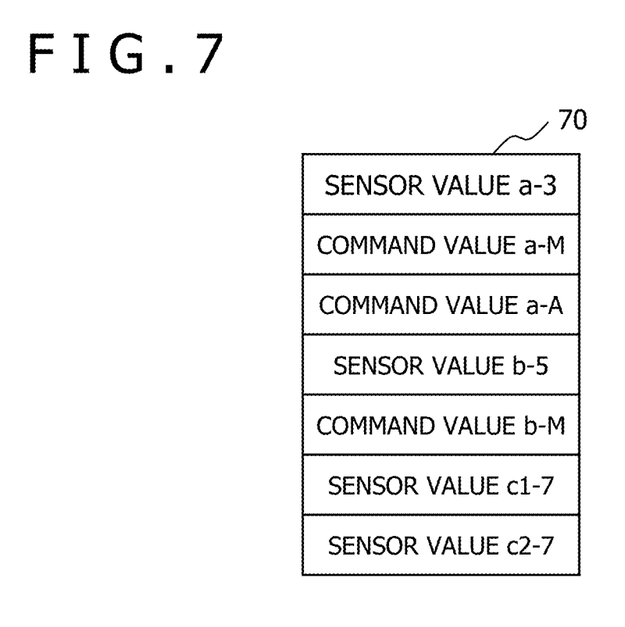
FIG. 7 is an explanatory diagram illustrating exemplary contents of a shared data storage unit of the control apparatus according to Embodiment 1.

FIG. 7 is an explanatory diagram illustrating exemplary contents of the shared data storage unit 303 of the control apparatus according to Embodiment 1.

In the control apparatus 102, before the calculation of a control command, the sensor information acquired by the control apparatus 100 from the sensor 7 at the time t3 (sensor value a-3), the sensor information acquired by the control apparatus 101 from the sensor 10 at the time t5 (sensor value b-5), and the sensor information acquired by the control apparatus 102 from the sensor 12 and the sensor 13 at the time t7 (sensor values c1-7 and c2-7) are stored in the shared data storage unit 303 as shared data 70. That is, in the control apparatus 102, the shared data 70 is the bare minimum sensor information necessary for control command calculation, and is sensor information that is selected according to the processing time difference between the control apparatuses for the same object to be manufactured (time difference of sensor information).

Then, the control apparatus 102 calculates a control command on the basis of these pieces of sensor information and stores the calculation result (control command) in the shared data storage unit 303. Note that, here, a control command for the motor 7 (command value a-M), a control command for the actuator 9 (command value a-A), and a control command for the motor 11 (command value b-M) that have been calculated earlier may be stored in the shared data storage unit 303.

Next, shared data sharing timings of the control apparatuses according to Embodiment 1 are described.

Figure 8A:
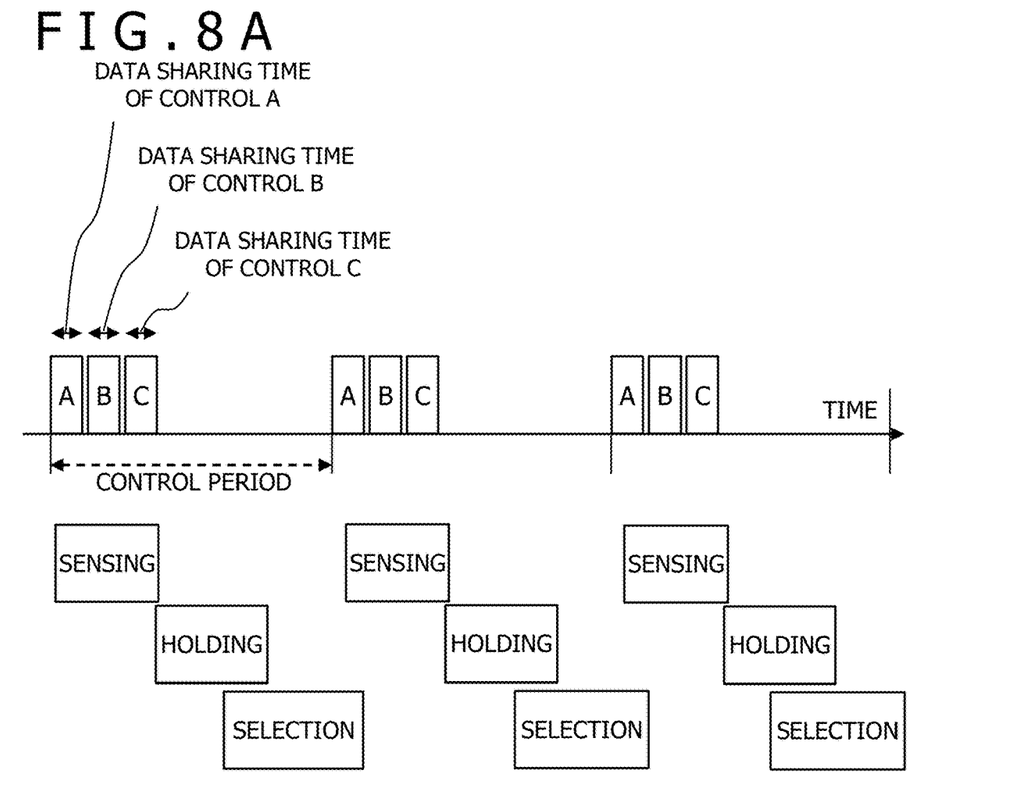
FIGS. 8A and 8B are explanatory diagrams illustrating shared data sharing timings of the control apparatuses according to Embodiment 1.
Figure 8B:
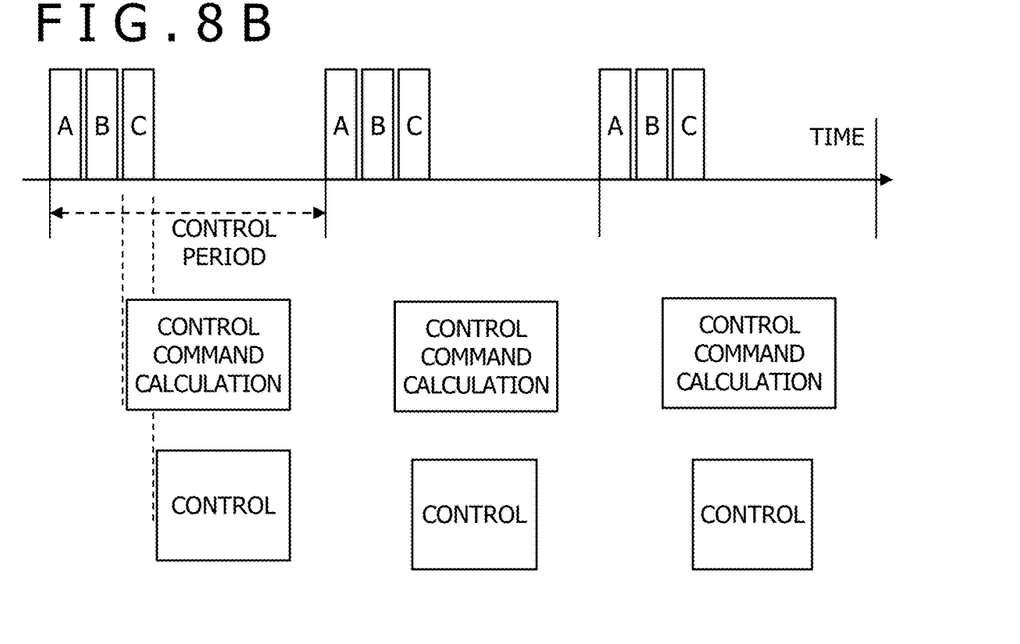

FIGS. 8A and 8B are explanatory diagrams illustrating the shared data sharing timings of the control apparatuses according to Embodiment 1.

The timing charts of FIGS. 8A and 8B illustrate the state where the control system executes processing on the basis of a control period determined in advance.

The timing chart of FIG. 8A illustrates that the shared data of the control apparatus 100, the control apparatus 101, and the control apparatus 102 is shared at the start of the control period.

When the control apparatus 100 shares the data and the data sharing time of the control apparatus 100 ends, the control apparatus 101 shares the data, and when the data sharing time of the control apparatus 101 ends, the control apparatus 102 shares the data (sensing). Then, when the data sharing time of the control apparatus 102 ends, the CPU of each control apparatus executes other types of processing such as calculation and control (holding and selection) by the start time of the next control period.

That is, each control apparatus acquires, holds, selects, and stores sensor information by the next data sharing time, to thereby update, by the synchronization updating unit 302, the shared data storage unit 303 of the control apparatus every control period to share the data.

The timing chart of FIG. 8B illustrates that the control apparatus 102 calculates a control command and shares the calculation result (control command).

When the data sharing period of the control apparatus 102 ends, the control apparatus 102 calculates a control command on the basis of the sensor information that is the shared data transmitted from the control apparatus 100 and the control apparatus 101 and the sensor information in the control apparatus 102.

Then, at the next data sharing time, the control apparatus 102 shares the obtained calculation result (control command) (transmits the obtained calculation result (control command) to the control apparatus 100 and the control apparatus 101), and the control apparatus 100 and the control apparatus 101 each control the corresponding motor or actuator according to the control command transmitted from the control apparatus 102.

Next, a flow of sharing, by the control apparatuses (control system) according to Embodiment 1, acquisition information acquired from the sensors is described.

Figure 9:
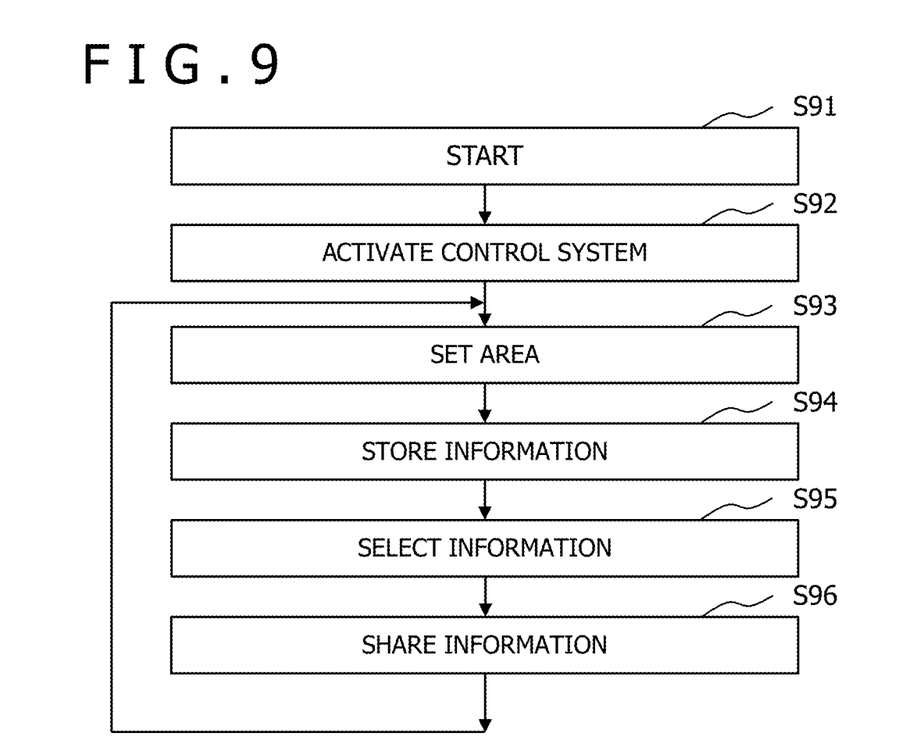
FIG. 9 is a flowchart illustrating a flow of sharing, by the control apparatuses (control system) according to Embodiment 1, acquisition information acquired from sensors.

FIG. 9 is a flowchart illustrating the flow of sharing, by the control apparatuses (control system) according to Embodiment 1, acquisition information acquired from the sensors.

In Step S91, the operation flow of the control system starts.

In Step S92, the control system is activated.

In Step S93, the holding area size of the information holding unit 307 is set by the area setting unit 306. Note that the flux rate of the control system is not necessarily constant, and in this case, the holding area size is preferably set according to a change in flux rate.

In Step S94, sensor information acquired by each control apparatus is stored in the information holding unit 307 together with a time at which the sensor information has been acquired.

In Step S95, sensor information is selected by the information selection unit 308 on the basis of synchronization time information added to the sensor information stored in the information holding unit 307. Then, the selected sensor information is stored in the shared data storage unit 303.

In Step S96, the selected sensor information is shared between the control apparatuses.

Then, these steps are repeated every control period.

Next, a flow of calculating a control command by one control apparatus (control system) according to Embodiment 1 and sharing the control command by the control apparatuses (control system) is described.

Figure 10:
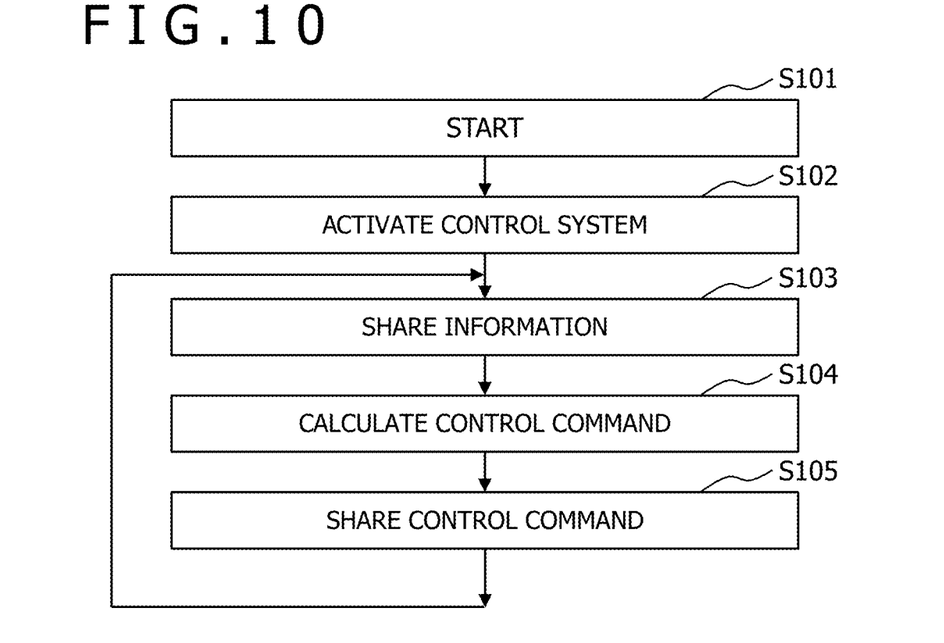
FIG. 10 is a flowchart illustrating a flow of calculating a control command by the control apparatus (control system) according to Embodiment 1 and sharing the control command by the control apparatuses (control system)

FIG. 10 is a flowchart illustrating the flow of calculating a control command by one control apparatus (control system) according to Embodiment 1 and sharing the control command by the control apparatuses (control system).

In Step S101, the operation flow of the control system starts.

In Step S102, the control system is activated.

In Step S103, selected sensor information is shared between the control apparatuses. Note that Step S103 corresponds to Step S96.

In Step S104, a control command is calculated by the calculation unit 401.

In Step S105, the calculated control command is shared between the control apparatuses.

Then, these steps are repeated every control period.

As described above, according to Embodiment 1, when the control apparatus 102 calculates a control command to be output to motors or actuators connected to the control apparatus 100 and the control apparatus 101, the control apparatus 102 can calculate the control command from sensor information acquired at the time when an object to be manufactured has been processed. Thus, a control command can be calculated from optimal acquisition information, so that highly accurate control can be achieved.

Note that the control apparatus configured to calculate a control command is not necessarily the control apparatus installed downstream and may be any control apparatus configured to acquire shared data. Further, shared data is not necessarily shared between all the control apparatuses, and the control apparatus configured to calculate a control command may acquire sensor information necessary for calculation and calculate the control command. In a similar manner, a control command is not necessarily shared between all the control apparatuses, and the control apparatus to which a motor or an actuator is connected may acquire the control command.

Embodiment 2

Next, an exemplary case where control apparatuses according to Embodiment 2 are applied to a FA system (control system) is described.

Figure 11:
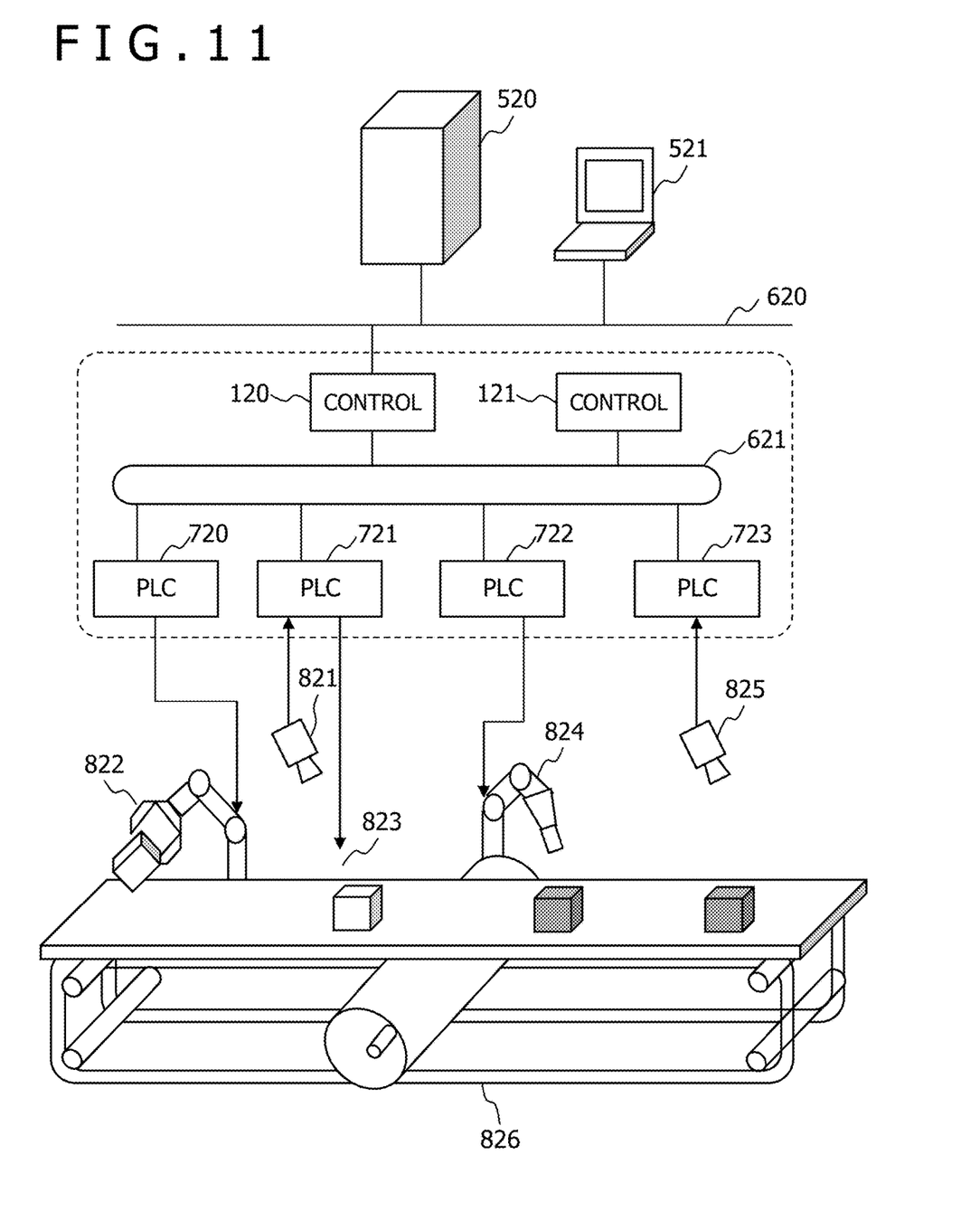
FIG. 11 is an explanatory diagram illustrating an exemplary case where control apparatuses according to Embodiment 2 are applied to a factory automation (FA) system.

FIG. 11 is an explanatory diagram illustrating the exemplary case where the control apparatuses according to Embodiment 2 are applied to the FA system.

The FA system controls, by a server 520 connected to an information local area network (LAN) 620 and a monitoring terminal 521 connected to the information LAN 620, a control apparatus 120 and a control apparatus 121 that are connected to a control LAN 621.

The control apparatus 120 controls a programmable logic controller (PLC) 720, a PLC 721, and a PLC 722 that are connected to the control LAN 621, and the control apparatus 121 controls a PLC 723 connected to the control LAN 621. That is, the PLC 720, the PLC 721, and the PLC 722 are controlled by the control apparatus 120, and the PLC 723 is controlled by the control apparatus 121.

Further, the PLC 720 controls a picking robot 822, and the PLC 721 controls a conveyor motor 823 and a camera 821. The PLC 722 controls a painting robot 824, and the PLC 723 controls a camera 825.

A product (object to be manufactured) is placed at a predetermined (proper) position (for example, product orientation) on a belt conveyor 826 by the picking robot 822 under the control of the PLC 720.

The belt conveyor 826 is moved at a predetermined speed by the conveyor motor 823 under the control of the PLC 721.

The product is conveyed by the belt conveyor 826 and captured by the camera 821 under the control of the PLC 721. The camera 821 observes whether this product has been placed at the predetermined position or not.

The PLC 721 acquires the image of the product captured by the camera 821 and checks whether the product has been placed at the predetermined position or not.

The painting robot 824 paints the surface of the product under the control of the PLC 722.

The camera 825 captures, under the control of the PLC 723, an image of the painted product to observe whether the product has been painted appropriately or not.

The PLC 723 acquires the image of the product captured by the camera 825 and checks whether the product has been painted appropriately.

Then, the control apparatus 120 receives an input of camera information (sensor information) from the camera 821, and the control apparatus 121 receives an input of camera information (sensor information) from the camera 825.

Then, the control apparatus 120 and the control apparatus 121 each select, on the basis of the input camera information, shared data that is camera information selected according to a time difference of camera information on the same product. The control apparatus 121 calculates, on the basis of the shared data, control commands for the picking robot 822 and the painting robot 824.

Note that times at which the picking robot 822 places a product, the camera 821 captures an image of the product, the painting robot 824 paints the product, and the camera 825 captures an image of the painted product are managed by the time management units 304 of the control apparatuses, and the time difference is acquired from the speed of the conveyor motor 823 and positions of the picking robot 822, the camera 821, the painting robot 824, and the camera 825 (distances between these four).

As described above, according to Embodiment 2, when the control apparatus 121 calculates control commands to be output to the picking robot 822 and the painting robot 824, which are connected to the control apparatus 120, the control apparatus 121 can calculate the control commands from camera information acquired at the time when the product passes. Thus, a control command can be calculated from optimal acquisition information, so that high-quality highly accurate control can be achieved.

Embodiment 3

Next, an exemplary case where control apparatuses according to Embodiment 3 are applied to a steel system (control system) is described.

Figure 12:
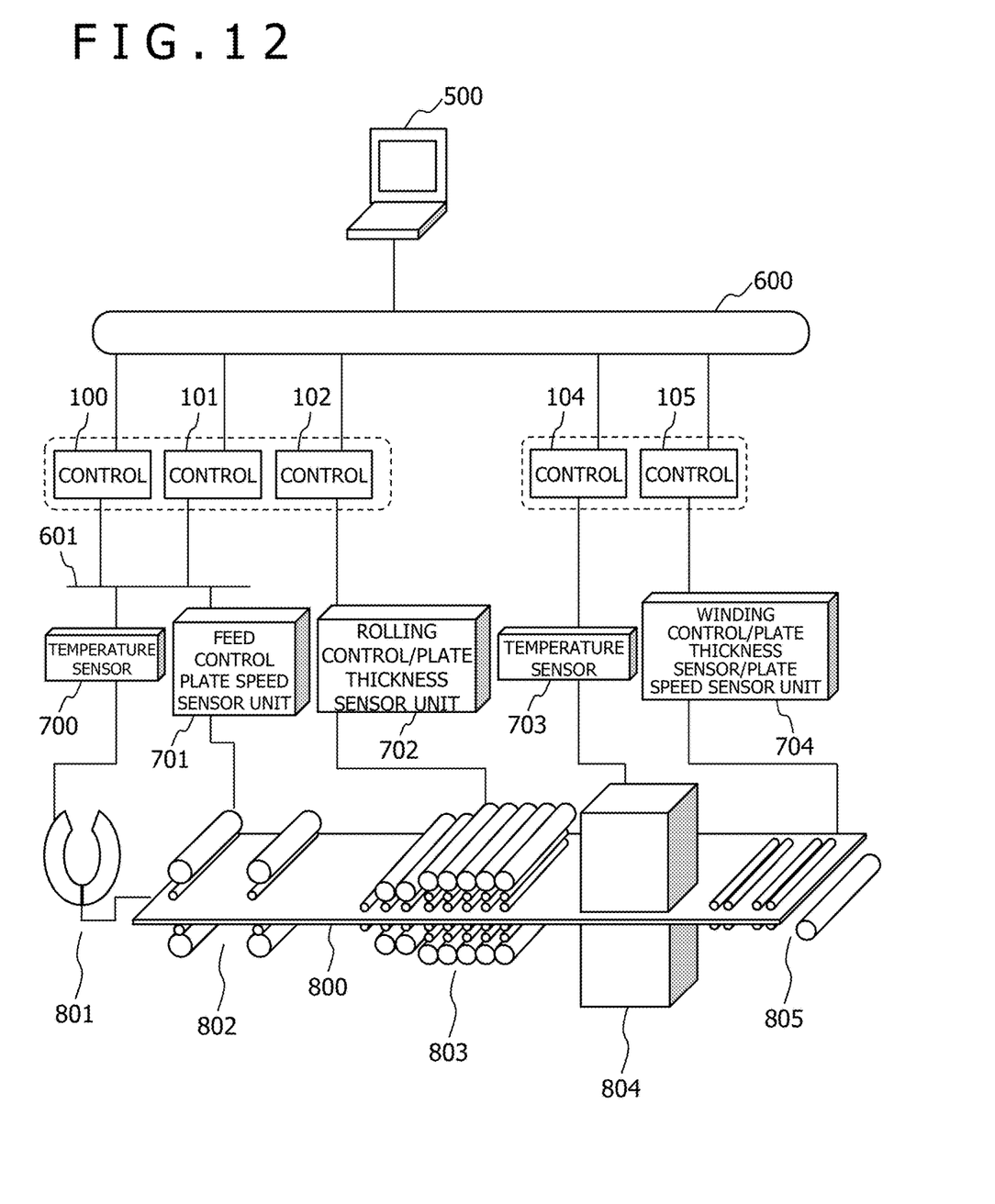
FIG. 12 is an explanatory diagram illustrating an exemplary case where control apparatuses according to Embodiment 3 are applied to a steel system.

FIG. 12 is an explanatory diagram illustrating the exemplary case where the control apparatuses according to Embodiment 3 are applied to the steel system.

In the steel system, a hot-rolling facility 800 for steel is controlled by a control apparatus 100, a control apparatus 101, a control apparatus 102, a control apparatus 104, and a control apparatus 105. The control apparatus 100, the control apparatus 101, the control apparatus 102, the control apparatus 104, and the control apparatus 105 are controlled by a terminal 500 connected to a common network 600.

Steel heated in a heating furnace 801 is put into the hot-rolling facility 800. The hot-rolling facility 800 includes a roughing mill 802, a finishing mill 803, a cooling facility 804, and a winder 805.

A temperature in the heating furnace 801 acquired by a temperature sensor 700 is input to the control apparatus 100 via a field network 601.

The control apparatus 101 controls a feed control/plate speed sensor unit 701 to adjust a rotation frequency of the roughing mill 802 and detect a feed speed of steel.

The control apparatus 102 controls a rolling control/plate thickness sensor unit 702 to adjust a rotation frequency and a tension of the finishing mill 803 and detect a plate thickness of steel.

A temperature in the cooling facility 804 acquired by a temperature sensor 703 is input to the control apparatus 104.

The control apparatus 105 controls a winding control/plate thickness sensor/plate speed sensor unit 704 to adjust a rotation frequency of the winder 805 and detect a plate thickness of steel and a winding speed of steel. Further, the control apparatus 105 calculates a control command for each control apparatus.

Further, each control apparatus executes control on the basis of the operation flow described above.

Here, the processing time of each control apparatus, that is, a time taken for steel to pass is acquired from the feed speed of the steel acquired from the feed control/plate speed sensor unit 701 or/and the winding speed of the steel acquired from the winding control/plate thickness sensor/plate speed sensor unit 704, a distance between the heating furnace 801 and the hot-rolling facility 800, and positions of the roughing mill 802, the finishing mill 803, the cooling facility 804, and the winder 805 (distances between these four).

As described above, according to Embodiment 3, when a control command that is output to adjust the rotation frequency of the roughing mill 802 connected to the control apparatus 101, a control command that is output to adjust the rotation frequency and tension of the finishing mill 803 connected to the control apparatus 102, and a control command that is output to adjust the rotation frequency of the winder 805 connected to the control apparatus 105 are calculated, the control apparatus 105 can calculate the control commands from sensor information acquired at the time when steel passes.

Thus, as compared to the method in which a past state is estimated from the current state and a control command for a control target is calculated on the basis of the estimation result, a control command can be calculated from optimal acquisition information, so that high-quality highly accurate control can be achieved.

Note that the control apparatuses described in Embodiment 1 are applicable to, in addition to FA systems and steel systems, various control systems such as water and sewage treatment systems, power generation control systems, elevator control systems, railroad control systems, automobile control systems, and construction machinery control systems.

Note that the present invention is not limited to the embodiments described above and includes various modified examples. For example, the embodiments have been specifically described to make it easy to understand the present invention. The present invention is not necessarily limited to including all the described components.

Further, some components of one of the embodiments can be replaced with some components of another embodiment. Further, components of one of the embodiments can be added to components of another embodiment. Further, some components of one of the embodiments can be removed and some components of another embodiment can be added, that is, the components can be replaced with the components of the other embodiment.

What is claimed is:

1. A control apparatus included in a distributed control system, comprising:
    at least one processor configured to:
        synchronize the control apparatus with another control apparatus included in the distributed control system in terms of time;
        control to receive information from the another control apparatus;
        add synchronization time information to the information and store the resulting information in at least one memory;

set an area of the at least one memory according to a time difference of the information;
select shared data from the information stored in the at least one memory;
calculate a control command for a control target;
store the selected shared data in the at least one memory,
transmit the selected shared data; and
calculate the control command for the control target based on the transmitted shared data,
wherein the time difference of the information is a difference from an acquisition time at which the control apparatus acquires first information regarding the control target from a first sensor and another acquisition time at which the another control apparatus acquires second information regarding the control target from a second sensor.

2. The control apparatus according to claim 1, wherein the at least one processor is further configured to:
store the information in the at least one memory in synchronization with storage of the information in another at least one memory of the another control apparatus.

3. The control apparatus according to claim 1, wherein the at least one processor is further configured to:
manage the synchronization time information based on a synchronization time.

4. The control apparatus according to claim 1, wherein the at least one processor is further configured to:
control to acquire the first information from the first sensor and the second information from the second sensor and control to execute input and output of information for controlling the control target.

5. The control apparatus according to claim 1, wherein the at least one processor is further configured to:
select the shared data based on the time difference of the information.

* * * * *